Oct. 9, 1934.  J. H. MINER  1,976,184
CULTIVATING APPARATUS
Filed Sept. 19, 1932   2 Sheets-Sheet 1

Inventor:
James H. Miner,
By Spear, Donaldson & Hall
Attorneys

Oct. 9, 1934.  J. H. MINER  1,976,184
CULTIVATING APPARATUS
Filed Sept. 19, 1932   2 Sheets-Sheet 2

Inventor:
James H. Miner,
By Spear, Donaldson & Hall
Attorneys

Patented Oct. 9, 1934

1,976,184

UNITED STATES PATENT OFFICE 1,976,184

CULTIVATING APPARATUS

James H. Miner, Meridian, Miss.

Application September 19, 1932, Serial No. 633,857

12 Claims. (Cl. 97—59)

This invention relates to garden cultivators of the single wheel type, and has for one of its objects to provide a machine of this character which will embody novel means adapting the machine to be equipped with a pair of rakes, a pair of cultivators blades, a plow or the like ground-working tool or tools.

The invention has for a further object to provide a machine of the character stated wherein the said means, hereinafter referred to as ground-tool carrying means, will embody a member secured to and between the handles of the machine, a pair of downwardly and forwardly inclined bars secured to said member at opposite sides of the longitudinal center of the machine, and ground-tool securing means carried by the lower ends of the bars.

The invention has for a further object to provide a machine of the character stated wherein the tool carrying bars will be connected to their supporting member for vertical adjustment and for swinging adjustment transversely of the machine, to the end that the tools may be arranged to straddle a row, to the end that one of the tools may be swung from its side of the row into inoperative position behind the other tool and above the ground, and to the end that the tool in inoperative position may be again swung into operative position at its side of the row, whereby one or both sides of the row may be cultivated as desired.

The invention has for a further object to provide a machine of the character stated wherein the tool carrying bars, when rakes are employed, may be actuated to arrange the rakes in position to straddle the row, to arrange one of the rakes in inoperative position or return it to operative position, and to also arrange the rakes in close relation so as to adapt the machine for cleaning rough ground.

With the foregoing and other objects in view, the nature of which will appear as the description proceeds, the invention resides in the construction, combination and arrangement of parts hereinafter fully described and claimed, and illustrated in the accompanying drawings, wherein:

Figure 1:
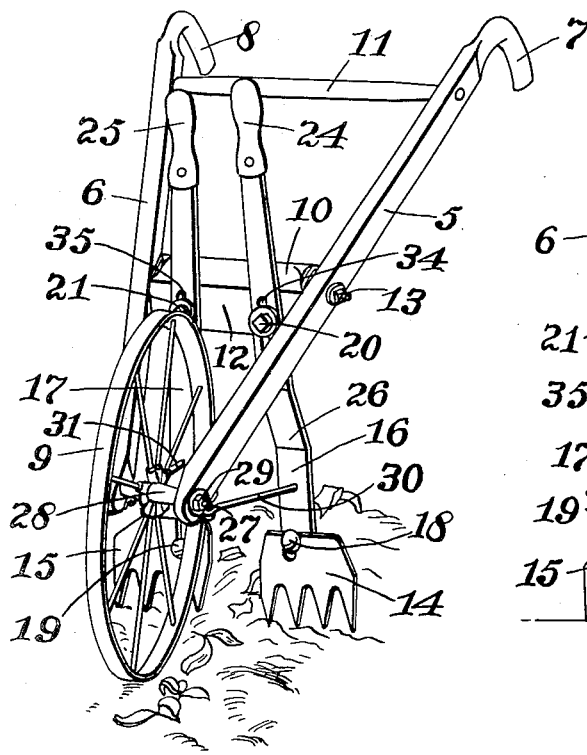
Fig. 1 is a perspective view of the cultivator equipped with rakes arranged to straddle a row of plants.
Figure 2:
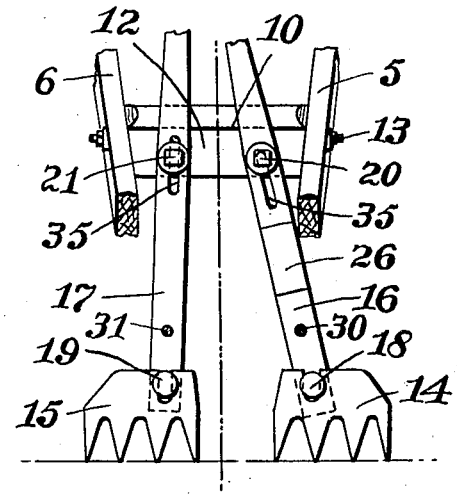
Fig. 2 is a diagrammatic section of the cultivator with the rakes in the position shown in Fig. 1.
Figure 4:
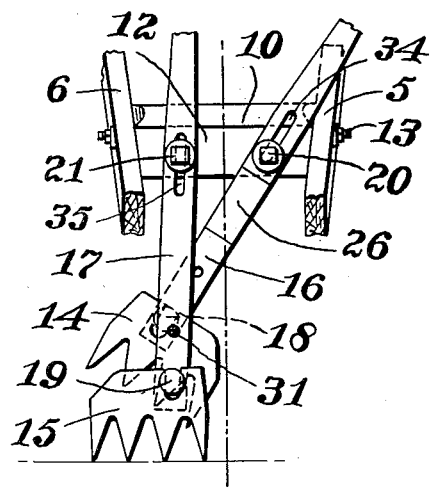
Fig. 4 is a similar view with one of the rakes in inoperative position behind the other.

The rakes 14 and 15 are detachably fixed to the lower ends of bars 16 and 17 by means of bolts 18 and 19. These bars are pivotally mounted by bolts 20 and 21 on a supporting member 10 secured to and between the handles 5 and 6 of the machine. The bolts 20 and 21 extend through the supporting member 10 and through the bars 16 and 17 intermediate the ends of the latter. The bolts 20 and 21 are equally spaced on opposite sides of the longitudinal center of the frame so that the lower depending ends of the bars are spaced apart. The upper extensions of the bars are provided with handles 24 and 25 for manually rocking or swinging the bars about their pivots to effect any adjusted relation of the rakes when the bolts 20 and 21 are sufficiently loosened. After the desired adjustment has been made, the bolts may be tightened to rigidly hold the bars in their adjusted position. Preferably the bar 17 is rigidly held in position on the supporting member 10 and only adjusted on rare occasions, while the other bar 16 is adapted to be moved at any time. The tension of its bolt is sufficient to hold the bar 16 in any adjusted position.

Further, the bars are so constructed and arranged that the rake carried by one of the bars may be moved to a position at the rear or behind and above the rake carried by the other bar by rocking the first bar about its pivot. For purposes of illustration, bar 16 is shown with an offset portion 26 which allows such relative movement, but it is to be expressly understood that either bar could be so constructed, and that other mechanical forms may be used for accomplishing this function.

The frame of which the supporting member 10 forms a part preferably consists of spaced, flaring handles 5 and 6 terminating at their upper ends in hand grips 7 and 8 and adapted at their lower ends to receive a single wheel 9 between them. The handles are held in their spaced, flaring relation by the supporting member 10 and others such as 11 adjacent the hand grips 7 and 8. The supporting member 10 is shown of rectangular cross section and of substantial width on one of its sides 12, and is so mounted between the handles 5 and 6 that the side 12 has a slight upward and forward inclination to impart a corresponding inclination to the bars 16 and 17. The carrying member 10 and cross brace 11 may be rigidly fixed between the handles 16 and 17 by any suitable means, the member 10 being shown as attached to the bars by means of a through bolt 13.

The form of journal for mounting the single wheel 9 between the lower ends of the handles 5 and 6 is illustrated as an axle 27 having screw threaded ends extending through apertures in the handles and the hub 28 of the wheel 9, and with suitable nuts 29 being provided for holding the axle in position in the frame.

Although not essential to the proper function of the apparatus thus far described, it may be found desirable to provide further bracing for the lower ends of the bars 16 and 17, particularly where rock or clay soil is encountered.

Such bracing may consist of rods 30 and 31 extending from the handles 5 and 6 to the bars 16 and 17. The brace rods 30 and 31 are provided at their front ends with hooks 30ª pivotally and detachably engaged with eyes 30ᵇ fixed to the lower ends of the handles 5 and 6. The rear ends of the brace rods 30 and 31 pass through the lower portions of the bars 16 and 17, and are screw-threaded for the reception of thumb nuts 30ᶜ which contact with the rear sides of the bars. The pivotal connection of the brace rods 30 and 31 with the handles 5 and 6 permits the bars 16 and 17, after the nuts 30ᶜ have been loosened, to be adjusted laterally with relation to each other to arrange the ground tools in proper relation to clean the ground or to cultivate both sides of a row, and also permits the bars 16 and 17 to be adjusted vertically without removing either of the rods. After the bars 16 and 17 have been adjusted, their bolts 20 and 21, and the nuts 30ᶜ of the brace rods 30 and 31 are tightened. When it is desired to arrange the ground tool carried by the bar 16 behind and above the ground tool carried by the bar 17, the brace rod 30 is disengaged from the handle 5 and the bar 16, and this may be readily done after removing the nut 30ᶜ from the brace rod 30.

The rakes 14 and 15 are detachably mounted on the lower ends of the bars 16 and 17 and may be replaced by the cultivator blades 32 or by the plow 33 without difficulty or loss of time. Preferably the nuts of the bolts 18 and 19 for attaching the rakes, cultivator blades or plow to the bars, and the nuts of the bolts 20 and 21 for attaching the bars to their supporting member are of the same size so that a single wrench may be used for either, and such a wrench would be carried in a receptacle on the frame at all times.

With the construction of apparatus described forming the subject matter of the present invention, the rakes 14 and 15 or the cultivator blades 32 may be quickly adjusted to a desired width apart, such as that required to cultivate on either side of a row of plants, by merely loosening the bolts 20 and 21 and rocking the bars 16 and 17 about their pivots by means of the handles 24 and 25, and then again tightening the bolts to provide a rigid structure. In the preferred adjustment the bar 17 is held rigidly by the bolt 21 while the bar 16 only is adjusted relative to the bar 17, the tension of the bolt 20 being sufficient to hold the bar 16 in its adjusted position. The apparatus can then be moved along a row of plants on the single wheel at one side of the row with the rakes 14 and 15 or the cultivator blades 32 engaging and loosening the earth on either side of the row, or the rakes or blades may be adjusted to both operate between the rows, or one of the rakes or blades can be moved to a position at the rear or behind and above the other to an inoperative position when it is desired to use only one of the rakes or blades.

Figure 3:
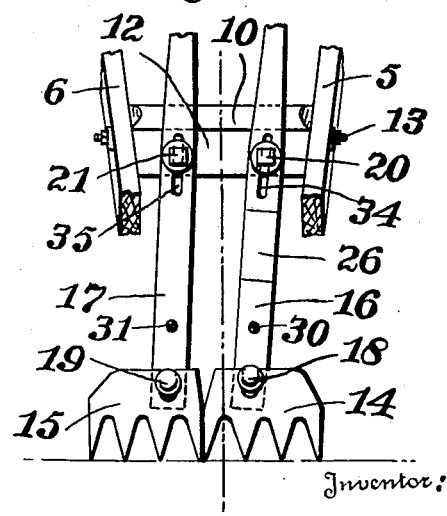
Fig. 3 is a similar view with the rakes in close or rough ground cleaning relation.
Figure 5:
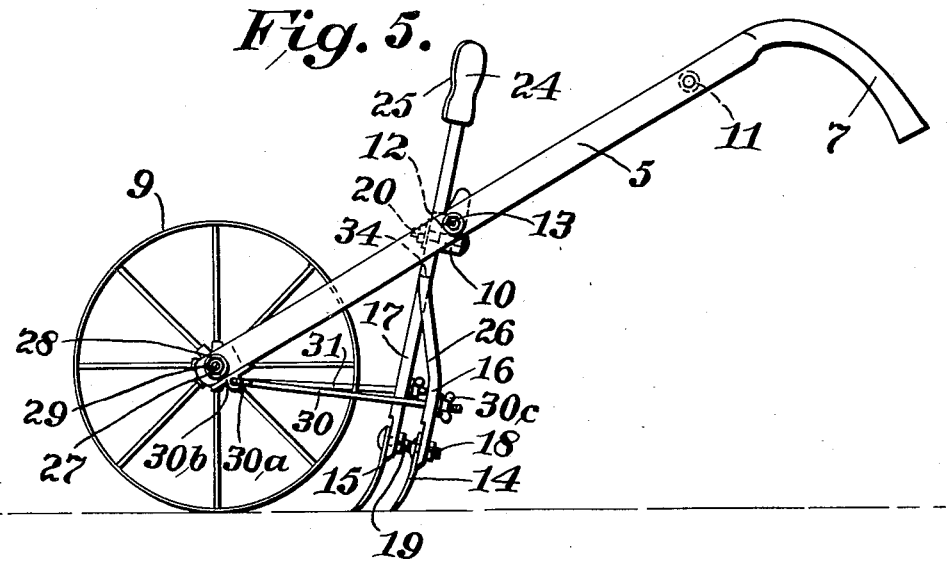
Fig. 5 is a view in side elevation of the cultivator with the rakes in the position in which they are shown in Fig. 1.
Figure 6:
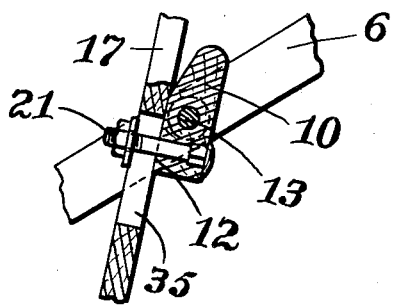
Fig. 6 is a detail sectional view showing the manner in which each ground-tool carrying bar is secured to the supporting member for such bars.
Figure 7:
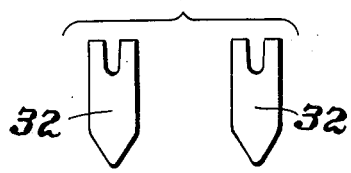
Fig. 7 is an elevational view of the cultivator teeth with which the machine is adapted to be equipped.
Figure 8:
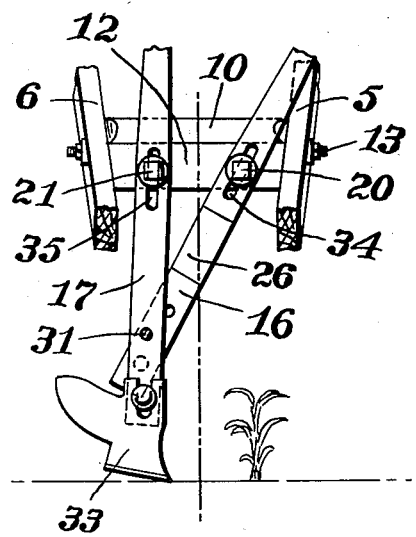
Fig. 8 is a diagrammatic section illustrating the machine equipped with a plow.

The rakes 14 and 15 may be used to scratch or mulch the soil at both sides of the plants, or they may be moved into close relation, as shown in Fig. 3, to adapt the machine to clean rough ground. The bars 16 and 17 are provided with longitudinal slots 34 and 35 through which the bolts 20 and 21 pass and which adapt the bars to be adjusted vertically with relation to their supporting member 10 and thus enable the rake or cultivator blade not to be used to be raised and supported above the ground in inoperative position behind the other rake or blade. The vertical adjustment of the bars 16 and 17 with relation to their supporting member 10 also permits the rakes or cultivator blades to be moved downwardly into proper spaced relation to the handles 5 and 6, after they have been swung to arrange them in the desired relation. The plow 33 is preferably secured to the bar 17, and when the plow is used the bar 16 occupies a position with its lower end behind the bar 17, in which position it will not interfere with the plow.

From the foregoing, taken in connection with the drawings, it will be understood that the bars 16 and 17 constitute the ground-tool carrying means, that this means may be readily actuated by the operator of the machine to arrange the ground-working tools to straddle the row of plants under cultivation, to arrange one of the ground working tools in inoperative position behind the other or return such tool to its place at the opposite side of the row, to position the rakes in close or ground cleaning relation, or to position one of the bars behind the other when but one ground-tool is to be used.

It will now be apparent to those skilled in the art that a simple, compact apparatus has been provided that is more easy of access and which may be more easily and cheaply manufactured than those heretofore known, but which is nevertheless efficient for the purpose intended.

While the cultivator is shown and described as being adapted to be manually propelled, it is to be understood that it may be built to be drawn by an animal, tractor or the like, and guided by hand, without departing from the spirit of my invention.

It will also be apparent to those skilled in the art that other mechanical expedients may be used in place of those described and illustrated and be within the scope of the present invention, and it is to be expressly understood that the drawings are not a definition of the limits of the invention, reference being had for this purpose to the appended claims.

I claim:

1. In a cultivator, a frame providing spaced handles and a cross brace between the handles, a pair of laterally spaced bars mounted against said brace for rocking movement transversely of the machine, said bars each being pivoted to said cross brace at a point intermediate of the length of the bars to provide an operating handle portion above the pivot and a cultivating element carrying portion below the pivot.

2. In a cultivator, a frame providing spaced handles and a cross brace between the handles, a pair of laterally spaced bars mounted against said brace for rocking movement transversely of the machine, said bars each being pivoted to said cross brace at a point intermediate the length of the bars to provide an operating handle portion above the pivot and a cultivating element carrying portion below the pivot, said bars being so constructed and arranged that one of the bars may be moved to an inoperative position with respect to the other at the rear of the other.

3. In a cultivator, a frame providing spaced handles and a cross brace between the handles, a pair of laterally spaced bars mounted against said brace for rocking movement transversely of the machine, said bars each being pivoted to said cross brace at a point intermediate the length of the bars to provide an operating handle portion above the pivot and a cultivating element carrying portion below the pivot, and means for clamping the bars in their adjusted position on the cross brace at the pivot.

4. In a hand operated cultivating apparatus, the combination of a frame having flaring handles, a single wheel journaled between the handles at the front ends thereof, a cross brace between the handles, and a pair of laterally adjustable cultivating elements mounted on the cross brace to have swinging movement in a substantially vertical plane, whereby the apparatus may be moved along a row by hand with cultivating elements on either side of the row.

5. In a hand operated cultivating apparatus, the combination of a frame having handles for manual manipulation, a single wheel on which the frame is mounted, a pair of bars depending from the frame, said bars having a swinging movement laterally of the wheel in substantially a vertical plane, and cultivating elements on the ends of the bars that can be adjusted to the desired width to straddle a row by a lateral movement of the bars.

6. In a hand operated cultivating apparatus, the combination of a frame having flaring handles, a single wheel journaled between the handles at the front ends thereof, a cross brace between the handles, a pair of bars pivotally mounted on the cross brace intermediate their ends and equally spaced from the center line of the frame, the axis of said pivotal mounting being substantially horizontal, and cultivating elements detachably fixed to the lower depending ends of the bars, said cultivating elements being adjustable to the desired lateral positions by a rocking of the bars about their pivots.

7. In a hand operated cultivating apparatus, the combination of a frame having flaring handles, a single wheel journaled between the handles at the front ends thereof, a cross brace between the handles, bolts extending through the cross brace and equally spaced on opposite sides of the center line of the frame, and bars pivotally and slidably mounted intermediate their ends on the bolts extending through the brace, said bars having handles on their upper extensions and cultivating elements on the ends of the lower extensions, said bars being movable about their pivots by the handles for lateral adjustment of the cultivating elements when the bolts are loosened and held rigid on the cross brace in adjusted position when the bolts are tightened.

8. In a hand operated cultivating apparatus, the combination of a frame having flaring handles, a single wheel journaled between the handles at the front ends thereof, a cross brace between the handles, bolts extending through the cross brace and equally spaced on opposite sides of the center line of the frame, and bars pivotally mounted intermediate their ends on the bolts extending through the brace, said bars having handles on their upper extensions and cultivating elements on the ends of the lower extensions, said bars being movable about their pivots by the handles for lateral adjustment of the cultivating elements when the bolts are loosened and held rigid on the cross brace in adjusted position when the bolts are tightened, one of said bars being so constructed and arranged as to be capable of movement about its pivot to a position where its cultivating element is at the rear of the cultivating element on the other bar, whereby the apparatus may be moved along a row by hand with the cultivating elements on either side of the row, or with a single cultivating element between the rows.

9. A cultivator comprising a wheel, two handles connected to the wheel, bars located behind the wheel, and extending downwardly from the handles, means for securing ground-working tools to the lower ends of the bars, and means for pivotally connecting the bars on a substantially horizontally axis to the handles for vertical and lateral adjustment to arrange the tools in position to straddle a row or to arrange one of the tools in inoperative position in rear of the other or to return such tool to its place at the opposite side of the row, whereby one or both sides of the row may be cultivated as desired.

10. A manually guided or propelled cultivator, including a frame, bars carrying ground-working tools, and means connecting the bars to the frame for vertical adjustment with relation thereto and for rocking adjustment transversely of the machine in a substantially vertical plane.

11. A cultivator comprising a wheel, two handles connected to the wheel, bars located behind the wheel, and extending downwardly from the handles, means for securing ground-working tools to the lower ends of the bars, means for connecting the bars to the handles for vertical and lateral adjustment to arrange the tools in position to straddle a row or to arrange one of the tools in inoperative position in rear of the other or to return such tool to its place at the opposite side of the row, and brace rods connected to the handles forwardly beyond the bars and connected to the bars below the means for connecting the bars to the handles.

12. In a cultivator comprising a frame and a wheel, a tool carried by the frame to work one side of a plant row, a second tool carried by the frame to work the other side of the plant row, and means including a pivotal connection for permitting movement of one of said tools to an inoperative position behind the other tool.

JAMES H. MINER.